US009222230B2

(12) United States Patent
Jeganathan et al.

(10) Patent No.: US 9,222,230 B2
(45) Date of Patent: Dec. 29, 2015

(54) POROUS SILICON OXIDE DRYING AGENTS FOR WATERBORNE LATEX PAINT COMPOSITIONS

(71) Applicant: Potters Industries, LLC, Wilmington, DE (US)

(72) Inventors: Suruliappa Jeganathan, Chadds Ford, PA (US); Chris Davies, Plymouth Meeting, PA (US); Kevin Goforth, Chester Springs, PA (US)

(73) Assignee: POTTERS INDUSTRIES, LLC, Wilmington, DE (US)

( * ) Notice: Subject to any disclaimer, the term of this patent is extended or adjusted under 35 U.S.C. 154(b) by 0 days.

(21) Appl. No.: 14/190,820

(22) Filed: Feb. 26, 2014

(65) Prior Publication Data

US 2014/0178128 A1    Jun. 26, 2014

Related U.S. Application Data

(63) Continuation-in-part of application No. 14/024,035, filed on Sep. 11, 2013.

(60) Provisional application No. 61/701,135, filed on Sep. 14, 2012.

(51) Int. Cl.
*E01F 9/00* (2006.01)
*E01F 9/04* (2006.01)
*C09D 5/33* (2006.01)

(52) U.S. Cl.
CPC ............... *E01F 9/041* (2013.01); *C09D 5/004* (2013.01)

(58) Field of Classification Search
CPC ............ E01F 9/041; E01F 9/044; E01F 9/08; E01F 9/081; C09D 5/004

USPC ............... 404/12, 14, 75, 94; 524/493, 494
See application file for complete search history.

(56) References Cited

U.S. PATENT DOCUMENTS

| 3,030,251 | A | | 4/1962 | La Bore et al. |
| 3,036,928 | A | | 5/1962 | Poole |
| 3,592,679 | A | | 7/1971 | Tully et al. |
| 4,090,887 | A | | 5/1978 | Marquisee et al. |
| 4,132,560 | A | | 1/1979 | Marquisee et al. |
| 4,166,047 | A | * | 8/1979 | Harsono et al. ............... 502/242 |

(Continued)

FOREIGN PATENT DOCUMENTS

| EP | 0525977 A1 | 2/1993 |
| EP | 0791637 A2 | 8/1997 |
| EP | 1158028 A1 | 11/2001 |

OTHER PUBLICATIONS

European Search Report for European Application No. 14160118.7-1302 dated Dec. 16, 2014.

*Primary Examiner* — Raymond W Addie
(74) *Attorney, Agent, or Firm* — Buchanan Ingersoll & Rooney PC

(57) ABSTRACT

A highway marking paint formed from a waterborne latex paint and porous silica having a pore volume in the range of 0.3 cc/g to 3.0 cc/g. The silica enables the paint to achieve sufficient viscosity to permit the application of a highway marking of at least 40 mil and preferably at least 120 mil. The highway marking paint can also include retroreflective glass beads. Optionally, the highway marking paint further includes an acrylic polymer emulsion. The porous silica can be mixed with an ion exchange resin to control the drying properties of the paint.

17 Claims, 1 Drawing Sheet

(56) References Cited

U.S. PATENT DOCUMENTS

| | | |
|---|---|---|
| 5,340,870 A | 8/1994 | Clinnin et al. |
| 5,544,972 A | 8/1996 | Boldt |
| 5,599,133 A * | 2/1997 | Costello et al. ............... 404/72 |
| 5,824,734 A | 10/1998 | Yang |
| 5,922,398 A | 7/1999 | Hermes et al. |
| 5,947,632 A | 9/1999 | Pirotta et al. |
| 6,013,721 A | 1/2000 | Schall et al. |
| 6,132,132 A | 10/2000 | Pirotta et al. |
| 6,333,068 B1 | 12/2001 | Durand et al. |
| 6,413,011 B1 | 7/2002 | Sobczak et al. |
| 6,475,556 B1 | 11/2002 | Sobczak et al. |
| 6,645,552 B1 | 11/2003 | Schall et al. |
| 2004/0110910 A1* | 6/2004 | Arjunan ..................... 526/127 |
| 2007/0166438 A1* | 7/2007 | Kitahata et al. ............. 426/242 |
| 2010/0112340 A1 | 5/2010 | Bell |
| 2010/0283007 A1 | 11/2010 | Robinson |

* cited by examiner

POROUS SILICON OXIDE DRYING AGENTS FOR WATERBORNE LATEX PAINT COMPOSITIONS

CROSS-REFERENCE TO RELATED APPLICATIONS

This application continuation-in-part of U.S. patent application Ser. No. 14/024,035, filed in the United States Patent and Trademark Office on Sep. 11, 2013, which claims priority to U.S. Provisional Patent Application No. 61/701,135 filed in the United States Patent and Trademark Office on Sep. 14, 2012, both of which are incorporated herein by reference.

BACKGROUND OF THE INVENTION

1. Field of the Invention

The present invention relates to the field of drying agents for waterborne paints and more particularly to porous silica drying agents for rapidly drying waterborne latex paint compositions.

2. Description of the Related Art

Two desirable features for highway marking paint compositions are that the compositions are durable and that they dry rapidly. Because of the manpower involved in marking roadways and the associated material costs, it is desirable that a highway marking last a minimum of 4 years and more preferably up to 7 years or longer. Moreover, it is highly desirable that the highway marking dry rapidly to prevent the paint from running across the roadway and to minimize the disruption to traffic flow while the highway marking is being applied.

One technique to enhance durability is to apply a thicker layer of paint. A thin paint layer of 25 mil or less will likely have a 1 year life and at best 2-3 years. A thicker paint layer of 60 mil or greater will typically last for 4-7 years. Accordingly, there is a strong desire to apply a thicker paint layer when marking highways.

The main constraint to applying a thick highway paint layer is the drying time of the paint. Thermoplastic materials that are heated immediately after application to set the paint layer have regularly been used to obtain the desired thick highway paint layer. However, because of its cost and need for extra machinery, there has been an effort to develop a less expensive paint system. Several of these systems are discussed below.

U.S. Pat. No. 6,013,721 describes the use of polymer containing one acid and one amine functionality to improve the storage stability and drying time of the waterborne paint. The system was able to produce a paint layer having a wet film thickness of 14 mil.

U.S. Pat. No. 5,544,972 shows the use of spraying mineral acid into paint stream to accelerate the drying time of binders. This acid spray when comes to contact with paint coagulates the resin salt by an acid-base reaction. This method is not practical in roads as use of mineral acids pose a lot health and other problems.

U.S. Pat. No. 5,947,632 describes the use of ion exchange resins as drying agents. Ion exchange resins are hollow polymers which absorb water in the paint and reduce the drying time on traffic markings. Such ion exchange resins include super absorbent polymeric gels (Sumica gel) and solid hollow sphere polymers (Ropaque® OP-62). This patent also mentions inorganic compounds capable of absorbing water by coordination, although experimental examples are provided only for the ion exchange resins.

U.S. Pat. No 6,132,132 discloses various types of drying agents including ion exchange resins, superabsorbent gels such as Sumica gel, and hollow-sphere polymers such as Ropaque® OP-62 to improve the drying time of the waterborne paint for traffic markings.

U.S. Pat. No. 6,475,556 discusses the need for fast drying of thick films of waterborne paint above 20 mil and up to 120 mil in thickness. However methods are disclosed that only dry films of 20-40 mil wet thickness. An ion exchange resin is used as the drying agent and a small amount of polyamine resin is added to the binder as well.

U.S. Pat. No. 6,413,011 describes multicomponent fast drying waterborne coatings of 13-15 mil wet film thickness. These coatings include extenders such as calcium carbonate, talc, silica and silicates as well as fillers such as glass beads, quartz and sand. The disclosed extenders are hard dense materials.

U.S. Pat. No. 6,645,552 describes the use of ion exchange resin as drying agent for waterborne paint with wet mil thickness of 30 mil. The paint is applied as a wet on wet or layer by layer coating; with each layer being 15 mil.

U.S. Pat. Nos. 6,013,721, 5,947,632, 6,132,132, 6,475,556, 6,645,552 and 6,413,011 all describe the use of large particle silica gel (Silica S21), alumina, silica-aluminas, silicas and silicates as extenders in paint formulations. Extenders are inactive materials present in any paint formulation to improve color and flow properties of the paint.

U.S. Pat. No. 5,340,870 describes the use of a filler such as calcium carbonate added to an acrylic binder to increase the viscosity and dry time of the paint. The filler is added at a 60-75% ratio relative to the binder. Because of the high content of the inorganic filler the paint dries fast but its storage stability is poor and it does not give durable markings once applied on roads.

U.S. Pat. No. 6,333,068 describes the use of metallic polychloride and synthetic polyamides as accelerators. These accelerators dry the 15 mil thickness waterborne paint fast.

U.S. Pat. No. 5,922,398 describes the use of pendant amino-containing polymer along with acrylic polymers so that the pH is adjusted to provide for fast drying. The coatings achieved with this system are described as having a wet film thickness of 15 mil.

Although the systems discussed in the patents above were able to speed up drying time of the highway paint, they were not able to achieve waterborne traffic markings having a thickness greater than 30 mil wet thickness. At such a thickness, the underlying roadway will need to be repainted on an annual basis. Moreover, the ion exchange resins described above absorb water at the same time the sulfonic acid group slowly reacts with acrylic resins thus weakening the resin. In addition, the brown color of the ion exchange resin makes the white highway marking line dirty and brown spots are seen after the traffic lines are striped. There is a need for a waterborne traffic marking system which has greater thickness and increased durability and will not discolor the marking stripe.

SUMMARY OF THE INVENTION

Highly durable thick lane markings have been typically applied by using thermoplastic binders at 80-120 mil wet thickness which are applied at high temperature (300-400° F.). Waterborne paint on the other hand is applied at ambient temperatures and is easier to make traffic markings. However, waterborne paint has not been used at these thicknesses because they require more time to dry and as the wet film thickness increases the liquid paint, although viscous, tends to flow sideways and run. The present invention provides a waterborne paint composition for highway traffic markings which can be applied at greater thicknesses than the current waterborne latex paint. The present invention also enables application of retroreflective elements on the thick paint layer to achieve retroreflective traffic markings.

The present invention is a waterborne paint of 40-120 mil wet thickness with improved durability and retroreflectivity. The paint composition uses regular waterborne paint, retroreflective glass beads, porous silica, and optionally an acrylic emulsion in water. The porous silica helps to form a highly viscous paint composition with glass beads through hydrogen bonding and reducing the pH of the latex paint. This paint provides very cost effective and environmentally friendly traffic markings of high thickness and an alternative to thermo plastic markings which requires high temperature to apply and are very expensive compared to waterborne paint.

The porous silicon oxide drying agent absorbs water and is four times more efficient than ion exchange resin. This improved efficiency permits a lesser amount of drying agent with the paint. Porous silicon oxide has no acid group present but only hydroxy groups which do not react with acrylic resins.

Existing waterborne traffic markings obtain faster drying times by using ion exchange resins. Even with such faster drying times, these existing systems can only achieve relatively thin paint layers of 15-30 mil wet thickness. The present invention uses retroreflective glass beads, porous silica, and optionally an acrylic emulsion in water to apply a thick paint layer having a wet thickness of 40 -120 mil with improved durability. The use of acrylic emulsion is optional depending on the road conditions.

DETAILED DESCRIPTION OF THE PREFERRED EMBODIMENTS

Figure 1:
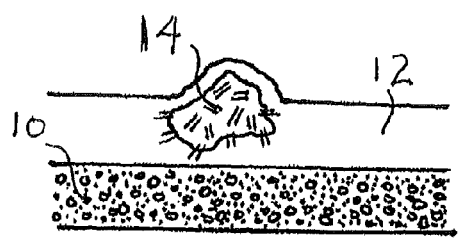
FIG. 1 is a schematic representation of a porous silica of the present invention applied to a paint layer.

The present invention is a fast drying silicon oxide drying agent for waterborne paints used in traffic markings on road, airport and other surfaces. Though silicas and silicates have been used as extenders in prior paint formulation, those silicas and silicates did not possess water absorption properties because they are large particle size inorganics and they are nonporous. Since these nonporous materials are not capable of absorbing water, they are suited for use as extenders in water based paint formulations.

It has been found that the porous properties of silicon oxides are in reducing the drying time of waterborne paints by absorbing water in the pores. Porous silicon oxide can added to the paint during or after the traffic markings are striped on a road surface. Optionally, porous silica cane be mixed with retroreflective glass beads and then applied to paint during or after traffic markings are applied.

Preferably, the porous silicon dioxide has a pore volume of 0.3 cc/g to 3.0 cc/g, more preferably of 0.8 cc/g to 2.5 cc/g, and even more preferably from 1.0 cc/g to 1.8 cc/g. The amount of porous silica which can be added to the paint can range from 1% to 20% wt/wt, preferably from 1% to 10%. The amount of silicon oxide used can be adjusted depending on the pore volume of the silicon oxide.

Porous silicon oxide can be mixed with other drying agents such as ion exchange resins and the blend can be used as drying agents for water borne paints. Other porous inorganic materials like porous aluminum oxide or porous zeolites (alumino silicates) are also used as drying agents for waterborne paints. Most commercially available zeolites are in powder form and though they are efficient as drying agents, their use is limited because of the powder nature. Applying a powder to paint, while striping on a road surface, is not practical. Moreover, large particle size zeolites are less efficient in drying.

Porous silicon oxides used in this invention are particles, size ranging from 10 US Mesh to 150 US Mesh, preferably from 16 US Mesh to 100 US Mesh, and the optional product is from 18 US Mesh to 80 US Mesh.

Porous silicon oxide particles can be blended with retroreflective glass beads of refractive index from 1.5 to 2.2, preferably from 1.5 to 1.9. Retroreflective glass beads particle size can be from 10 US Mesh to 200 US Mesh, preferably from 14 US Mesh to 170 US Mesh.

In addition to drying efficiency difference, porous silica and typical ion exchange resins such as Dow Chemical's Fast Track QS-2 differ in their particle size and surface properties. Ion exchange resins are typically hollow round polymers whose surface is mostly hydrophobic due to a styrene backbone. Ion exchange resins are made from styrene as the major monomer and styrene sulfonic acid as a minor monomer. In contrast, porous silica is cross linked polymeric network of silicon and oxygen atoms having hydroxyl groups on the surface. Porous silica particles are also of various and irregular shapes.

Figure 2:
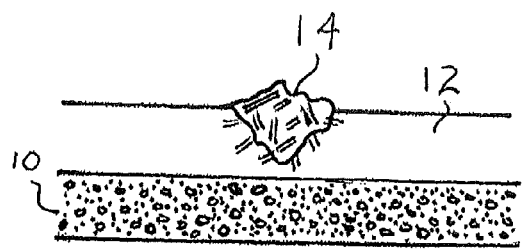
FIG. 2 is a schematic representation of a porous silica of the present invention applied to a paint layer after the paint layer has dried.

As shown in FIG. 1, silica particles 14 are provided in paint layer 12 which is applied to roadway surface 10. Silica particles 14 provide mechanical bonding between the paint 12 and silica 14 after the coating is dried. As shown in FIG. 2, after the paint layer 12 has dried, silica particle 14 will remain bonded in paint layer 12.

Figure 3:
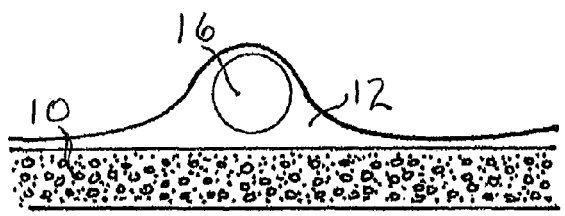
FIG. 3 is a schematic representation of an ion exchange resin applied to a paint layer.
Figure 4:
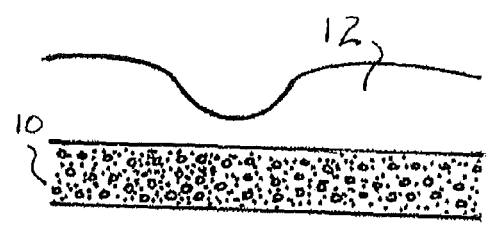
FIG. 4 is a schematic representation of an ion exchange resin applied to a paint layer after the paint layer has dried.

FIG. 3 shows ion exchange resin particles 16 provided in paint layer 12. The round shape and smooth surface of resin particles 14 provides minimal mechanical bonding between the resin particle 16 and paint 12 after the paint has dried. As shown in FIG. 4, after the paint layer 12 has dried, resin particle 16 can readily escape leaving a void in the paint layer 12/

The surface hydroxyl groups of porous silica form efficient hydrogen bonding with the acrylic polymers of the latex paint, whereas the styrene backbone of the ion exchange resin has no functionality for hydrogen bonding. The few sulfonic acid groups present in the ion exchange resin first react with the ammonium salt of paint layer 12 and only the remaining unreacted sulfonic acid groups form hydrogen bonds with paint layer 12.

The waterborne latex paint used in this invention can be the regular paint used for highway traffic markings. Examples include paints from Sherwin Williams or Ennis.

The glass beads added to the paint are retroreflective beads having a particle size ranging from 20 to 200 US Mesh. The advantage of providing these beads inside the paint layer is to increase the retroreflectivity as the paint begins to wear.

Porous silica when added to the paint helps to increase the viscosity of the paint through strong hydrogen bonding with acrylic polymer and water. This also reduces the pH of the paint which is usually basic. Porous silica is acidic with pH of 6-6.5. It is presently believed that the acidic nature of the porous silica as well as the pores permits the present paint system to set up quicker and allow greater thicknesses.

When these three components, paint, glass beads and porous silica, are mixed, the overall formulation becomes more viscous than the paint, thus allowing the formulation to be sprayed or drawn down on surfaces like asphalt or others so that a wet film thickness of 60-120 mil can be achieved. Addition of an acrylic water based binder like Ropaque® Ultra EF, Rovene® 6018, and Rovene® 6020 helps the paint layer to dry easily without any cracks.

The retroreflective glass beads can be dropped over or otherwise mixed with the 60-120 mil thick paint layer to achieve retroreflectivity. Such glass beads include standard M247, Ultra 1.9®, VisiMax®, and Visibead®, all trademarks of Potters Industries.

Since the present invention deals with thick waterborne paint layer, bigger beads like Visibead® can also be added in the paint formulation that helps to maintain retroreflectivity better than small beads as the paint begins to wear. In addition, such larger beads also provide improved wet night visibility.

EXAMPLES

Example 1

In a plastic beaker, 300 g of Sherwin Williams® white paint was added followed by 60 g of glass beads (80-200 US mesh) and 15 g of porous silica (18-80 US mesh). After mixing, the resulting paint composition was drawn down on a 6×18 inch glass panel using a blade with 100 mil gap. Standard M247 glass beads (coated with Potters® AC-110 formulation) were dropped over the paint layer and the composition was dried at room temperature.

In place of Standard M247 beads, other retroreflective beads such as Visibead®, VisiMax®, Ultra 1.9® beads can also be dropped.

Example 2

In a plastic beaker, 300 g of Sherwin Williams® yellow paint was added followed by 60 g of glass beads (80-200 US mesh) and 15 g of porous silica (18-80 US mesh). After mixing, the resulting paint composition was drawn down on a 6×18 inch glass panel using a blade with 100 mil gap. Standard M247 glass beads (coated with Potters® AC-110 formulation) were dropped over the paint layer and the composition was dried at room temperature.

In place of Standard M247 beads, other retroreflective beads such as Visibead®, VisiMax®, Ultra 1.9® beads can also be dropped.

Example 3

In a plastic beaker, 300 g of Sherwin Williams® white paint was added followed by 60 g of glass beads (80-200 US mesh) and 15 g of porous silica (18-80 US mesh). After mixing, the resulting paint composition was drawn down on a 6×18 inch glass panel using a blade with 100 mil gap. A combination of two retroreflective beads, Standard M247 glass beads (coated with Potters AC-110 formulation) and a high refractive index (1.9) 50/80 US mesh bead, were dropped over the paint layer and the composition was dried at room temperature.

In place of Standard M247 beads, other retroreflective beads such as Visibead®, VisiMax®, Ultra 1.9® beads can also be dropped.

Example 4

In a plastic beaker, 300 g of Sherwin Williams® yellow paint was added followed by 60 g of glass beads (80-200 US mesh) and 15 g of porous silica (18-80 US mesh). After mixing, the resulting paint composition was drawn down on a 6×18 inch glass panel using a blade with 100 mil gap. A combination of two retroreflective beads, Standard M247 glass beads (coated with Potters AC-110 formulation) and a high refractive index (1.9) 50/80 US mesh bead, were dropped over the paint layer and the composition was dried at room temperature.

In place of Standard M247 beads, other retroreflective beads such as Visibead®, VisiMax®, Ultra 1.9® beads can also be dropped.

Example 5

In a plastic beaker, 300 g of Sherwin Williams® yellow paint was added followed by 60 g of Visibead® beads and 15 g of porous silica (18-80 US mesh). After mixing, the resulting paint composition was drawn down on a 6×18 inch glass panel using a blade with 100 mil gap. A combination of two retroreflective beads, Standard M247 glass beads (coated with Potters AC-110 formulation) and a high refractive index (1.9) 50/80 US mesh bead were dropped over the paint layer and the composition was dried at room temperature.

In place of Standard M247 beads, other retroreflective beads such as Visibead®, VisiMax®, Ultra 1.9® beads can also be dropped.

Example 6

In a plastic beaker, 300 g of Sherwin Williams® white paint was added followed by 60 g of glass beads (80-200 US mesh), 15 g of porous silica (18-80 US mesh), and 15 g of acrylic emulsion Ropaque® Ultra EF (DOW). After mixing, the resulting paint composition was drawn down on a 6×18 inch glass panel using a blade with 100 mil gap. Standard M247 glass beads (coated with Potters® AC-110 formulation) were dropped over the paint layer and the composition was dried at room temperature.

In place of Standard M247 beads, other retroreflective beads such as Visibead®, VisiMax®, Ultra 1.9® beads can also be dropped.

Instead of Ropaque® acrylic emulsion, other acrylic emulsion like Rovene® 6018 or Rovene® 6020 can also be used.

Example 7

In a plastic beaker, 300 g of Sherwin Williams® yellow paint was added followed by 60 g of glass beads (80-200 US mesh), 15 g of porous silica (18-80 US mesh), and 15 g of acrylic emulsion Ropaque® Ultra EF (DOW). After mixing, the resulting paint composition was drawn down on a 6×18 inch glass panel using a blade with 100 mil gap. Standard M247 glass beads (coated with Potters® AC-110 formulation) were dropped over the paint layer and the composition was dried at room temperature.

In place of Standard M247 beads, other retroreflective beads such as Visibead®, VisiMax®, Ultra 1.9® beads can also be dropped.

Instead of Ropaque® acrylic emulsion, other acrylic emulsion like Rovene® 6018 or Rovene® 6020 can also used.

Example 8

Flow Properties

One hundred and fifty grams of Sherwin Williams waterborne latex paint with or without either glass beads or porous silica gel was placed in a metal can and then the can was placed at a 45 degree angle and the contents were allowed to flow and captured in another container placed below. The weight of the material flowed to the second can was determined which is the flow rate. The higher the flow rate percentage, the less viscous are the contents. The low viscosity allows the formulation to be applied at higher wet mil thickness. Table 1 illustrates the effect of silica gel on the viscosity of the formulation.

TABLE 1

| Formulation | Flow late |
|---|---|
| SW paint (150 g) | 89% |
| SW paint (150 g) + 30 g M247 beads | 89% |
| SW paint (150 g) + 30 g M247 beads + 7.5 g porous silica gel | 77% |

Example 9

Road Trials

Trial 1: At the truck speed of 1 mph, the product described Example 1 (60 g of glass beads (80-200 US mesh) and 15 g of porous silica (18-80 US mesh)) was injected into the paint stream at 0.23-0.36 kg/liter of paint. The thickness of the traffic markings was at 50-55 wet mil and the drying time was about 30 min. The drop on bead for retro reflectivity on this marking was the standard M247 AC110 glass beads (Potters Industries).

Trial 2: At the truck speed of 2 mph, the product described in Example 1 (60 g of glass beads (80-200 US mesh) and 15 g of porous silica (18-80 US mesh)) was injected into the paint stream at 0.6 kg/liter of paint. The thickness of the traffic markings was at 40-50 wet mil and the drying time was about 20 min. The drop on bead for retro reflectivity on this marking was the standard M247 AC110 glass beads (Potters Industries).

Trial 3: At the truck speed of 3 mph, the product described in Example 1 (60 g of glass beads (80-200 US mesh) and 15 g of porous silica (18-80 US mesh)) was injected into the paint stream at 1.2 kg/liter of paint. The thickness of the traffic markings was at 60-70 wet mil and the drying time was about 5 min. The drop on bead for retro reflectivity on this marking was the standard M247 AC 110 glass beads (Potters Industries).

Experimental Procedure:

The following experiment was conducted to determine the drying efficiency of porous silicon oxides. In a 4 oz. plastic cup, 20 g of waterborne latex paint (Sherwin Williams yellow paint) was placed and 3.3 g of the drying agent was added to the paint and stirred by hand using a wood spatula (wood applicator). The time took from the beginning until the paint can't be stirred any more (completely solidified) is determined and shown in Table 2 below.

TABLE 2

| Products | Time took for the paint to solidify completely |
|---|---|
| Paint without any drying agent | >80 min |
| Ion Exchange Resin QS-2 (Dow Chemical commercial product) | 40-45 sec |
| Large particle Silica gel (non porous, 6-10 US Mesh) | >50 min |
| Large particle Silica gel (non porous, 14-20 US Mesh) | >50 min |
| Porous Silicon oxide (pore volume 0.83 cc/g) | 2 min |
| Porous Silicon oxide (pore volume 1.0 cc/g) | 20-25 sec |
| Porous Silicon oxide (pore volume 1.4 cc/g) | 10-12 sec |
| Porous Silicon oxide (pore volume 1.8 cc/g) | 10-12 sec |
| Porous Silicon oxide (pore volume 2.5 cc/g) | 5-8 sec |
| Porous Silicon oxide (pore volume 3.0 cc/g) | 4-5 sec |
| Porous Silicon oxide (pore volume 1.8 cc/g) 1 g silica for 20 g paint | 20-25 sec |
| Porous Silicon oxide (pore volume 3.0 cc/g) 1 g silica for 20 g paint | 10-12 sec |
| Zeolite CBV 760 (porous, powder) 3.3 g | 10-12 sec |
| Zeolite CBV 100 extrude Large particle porous silica | 5 min |

These experiments show as the pore volume increases the drying time decreases. The drying time can be adjusted by increasing or decreasing the amount of porous silica gel. Drying time is depended on the quality of paint (amount of water in the composition).

Experimental Design for Dry Time Comparison in Prototype Traffic Marking:

Using a hand held spray gun (2 quart volume, 30-60 psi pressure), Sherwin Williams yellow water borne paint TM 2153 (0.5 L) was poured into the container and the air pressure was set at 40 psi. From a height of about 12 inches paint was sprayed on a 6 inch×12 inch aluminum panel using the spray gun. After spraying one time the wet mil thickness was measured and specific quantity of drying agent was dropped from a drop box, immediately after this a second layer of paint was sprayed on this thereby sandwiching the drying agent. By adjusting the gun pressure the wet mil thickness of the coating can be controlled when sprayed. Retroreflective glass beads were dropped on the second layer of coating and the dry time was measured by drawing a line across the panel using wood applicator (examples 10-13, below). When the layer is completely dried no more line can be drawn with wood applicator and the time it took from the start is marked as dry time.

Example 10

After spraying a first layer paint of 25 mil wet thickness, 14 g of a 2:1 blend of AASHTO Type I glass beads and Dow Chemical ion exchange resin Fast Track QS-2 was dropped on the paint layer. Immediately a second layer of paint was sprayed (25 mil wet thickness) followed by 18 g of AASHTO Type I retroreflective glass beads. It took 13 minutes to dry for this marking.

Example 11

Example 10 was repeated except, instead of Fast Track QS-2 resin, 14 g of a 2:1 blend of AASHTO Type I glass beads and porous silica described in this invention was used. The dry time for this marking is 6 minutes.

Example 12

After spraying a first layer paint of 14 mil wet thickness, 5 g of Dow Chemical ion exchange resin Fast Track QS-2 was dropped on the paint layer. Immediately a second layer of paint was sprayed (14 mil wet thickness) followed by 18 g of AASHTO Type I retroreflective glass beads. It took 4 minutes to dry for this marking.

Example 13

Example 12 was repeated except, instead of Dow Fast Track QS-2 resin, 5 g of porous silica described in this invention was used. The dry time for this marking is 2 minutes.

Example 14

Control Without Drying Agent

In a plastic beaker, 150 g of Sherwin Williams yellow paint was added followed by 30 g of small glass beads (80-200 US Mesh) and mixed by hand for 15 seconds. The resulting paint composition was drawn down on a 6 inch×12 inch aluminum panel using a blade with 100 mil gap and AASHTO M247 glass beads (coated with Potters AC-110 formulation) were dropped over the paint layer from a drop box. The composition was dried at room temperature and the dry time was measured by drawing a line across the panel using wood applicator. It took about 120 minutes to dry.

Example 15

With Fast Track QS-2

In a plastic beaker, 150 g of Sherwin Williams yellow paint was added followed by 30 g of small glass beads (80-200 US Mesh) and 7.5 g of drying agent Fast Track QS-2 and mixed by hand for 15 seconds. The resulting paint composition was drawn down on a 6 inch×12 inch aluminum panel using a blade with 100 mil gap and AASHTO M247 glass beads (coated with Potters AC-110 formulation) were dropped over the paint layer from a drop box. The composition was dried at room temperature and the dry time was measured by drawing a line across the panel using wood applicator. It took about 70 minutes to dry.

Example 16

In a plastic beaker, 150 g of Sherwin Williams yellow paint was added followed by 30 g of small glass beads (80-200 US Mesh) and 7.5 g of porous silica (18-80 US Mesh) and mixed by hand for 15 seconds. The resulting paint composition was drawn down on a 6 inch×12 inch aluminum panel using a blade with 100 mil gap and AASHTO M247 glass beads (coated with Potters AC-110 formulation) were dropped over the paint layer from a drop box. The composition was dried at room temperature and the dry time was measured by drawing a line across the panel using wood applicator. It took about 40 minutes to dry.

Example 17

In a plastic beaker, 150 g of Sherwin Williams yellow paint was added followed by 30 g of small glass beads (80-200 US Mesh) and 4 g of porous silica (18-80 US Mesh) and mixed by hand for 15 seconds. The resulting paint composition was drawn down on a 6 inch×12 inch aluminum panel using a blade with 100 mil gap and AASHTO M247 glass beads (coated with Potters AC-110 formulation) were dropped over the paint layer from a drop box. The composition was dried at room temperature and the dry time was measured by drawing a line across the panel using wood applicator. It took about 60 minutes to dry.

Effect of Drying Agents Color on White Traffic Paint:

On a small aluminum panel (3 inch×6 inch), Sherwin Williams white traffic paint (TM 2152) coated at 15 mil wet thickness using a drawdown blade and this is a control for starting color. On a second panel on the white paint at 15 mil wet thickness 3 g of drying agent Fast track QS-2 was dropped using a drop box. On a third panel on the white paint at 15 mil wet thickness 3 g of drying agent porous silica was dropped using a drop box. All three panels were dried at room temperature overnight and the color was measured using a Konica-Minolta colorimeter. The drying agent QS-2, a brown color beads, affects the color of the white paint and the color data is shown below.

|  | L | a | b | dE |
|---|---|---|---|---|
| White paint | 90.34 | −0.17 | 3.21 | Control |
| White paint and porous silica | 91.87 | −0.06 | 4.41 | 1.95 |
| White paint and QS-2 | 88.65 | 1.82 | 13.09 | 10.23 |

Any documents referenced above are incorporated by reference herein. Their inclusion is not an admission that they are material or that they are otherwise prior art for any purpose.

Although the invention is illustrated and described herein with reference to specific embodiments, the invention is not intended to be limited to the details shown. Rather, various modifications may be made in the details within the scope and range of equivalents of the claims and without departing from the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Use of the term "about" should be construed as providing support for embodiments directed to the exact listed amount. No language in the specification should be construed as indicating any non-claimed element as essential to the practice of the invention.

Although the present invention has been described with respect to its application in highway marking paint compositions, it is to be distinctly understood that the present invention can be used in connection with other waterborne paints.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A highway marking paint comprising:
    a. waterborne latex paint; and
    b. porous silica having a pore volume in the range of 1.0 cc/g to 3.0 cc/g and a particle size ranging from 10 US Mesh to 150 US Mesh.

2. The highway marking paint of claim 1 wherein the porous silica has a pore volume in the range of 0.8 cc/g to 2.5 cc/g.

3. The highway marking paint of claim 2 wherein the porous silica constitutes from 1% to 20% by weight of the paint.

4. The highway marking paint of claim 1 wherein the porous silica constitutes from 1% to 20% by weight of the paint.

5. The highway marking paint of claim 4 wherein the porous silica constitutes from 1% to 10% of the paint.

6. The highway marking paint of claim 1 further comprising an ion exchange resin.

7. The highway marking paint of claim 1 further comprising retroreflective glass beads.

8. A highway marking having a thickness of at least 60 mil comprising:
    a. waterborne latex paint;
    b. porous silica having a pore volume in the range of 1.0 cc/g to 3.0 cc/g.

9. The highway marking of claim 8 further comprising retroreflective glass beads.

10. The highway marking of claim 7 further comprising an ion exchange resin.

11. The highway marking of claim 8 having a thickness of at least 90 mil.

12. The highway marking of claim 11 having a thickness of at least 120 mil.

13. A method of applying a highway marking comprising the steps of:
    a. dispensing a stream of a waterborne latex paint,
    b. forming a paint composition by directing into said stream of a waterborne latex paint a stream of a porous silica having a pore volume in the range of 1.0 cc/g to 3.0 cc/g, and
    c. applying said paint composition to a transportation corridor at a thickness of at least 40 mil.

14. The method claim 13 wherein the porous silica is mixed with an ion exchange resin.

15. The method of claim 13 wherein said paint composition further includes retroreflective glass beads and an acrylic polymer emulsion.

16. The method of claim 13 wherein said porous silica has a particle size ranging from 10 US Mesh to 150 US Mesh.

17. The method of claim 13 wherein said paint composition has a thickness of at least 60 mil.

* * * * *